Patented Oct. 20, 1925.

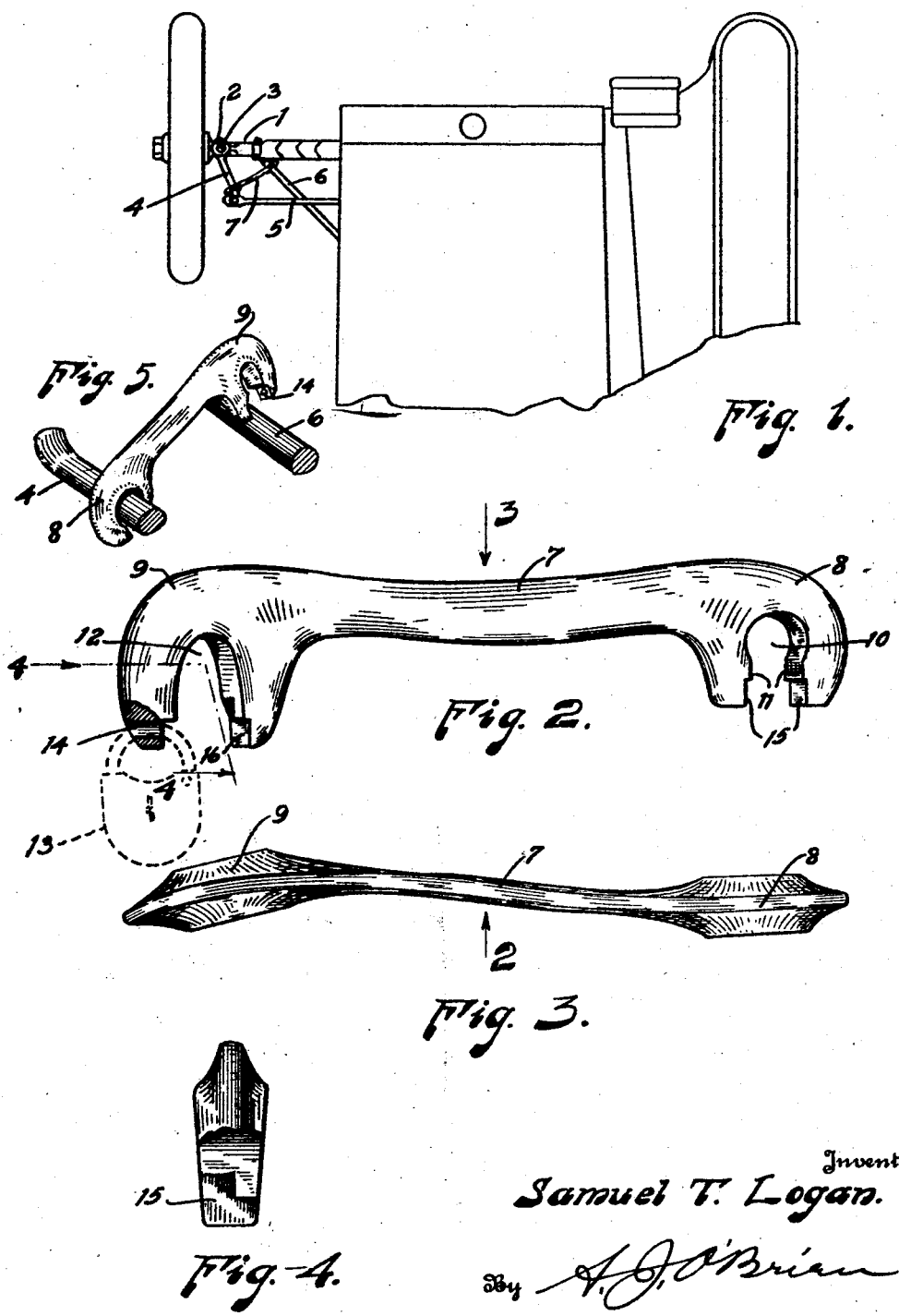

1,557,713

UNITED STATES PATENT OFFICE.

SAMUEL T. LOGAN, OF DENVER, COLORADO.

COMBINED WHEEL-HOLDER, LOCK, AND WRENCH.

Application filed March 14, 1924. Serial No. 699,344.

*To all whom it may concern:*

Be it known that I, SAMUEL T. LOGAN, a citizen of the United States, residing at Denver, in the county of Denver and State of Colorado, have invented certain new and useful Improvements in Combined Wheel-Holders, Locks, and Wrenches; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a device for holding an automobile wheel from oscillating about its spindle bolt, for locking the car against theft, and for use as a wrench.

It is well known to all who have ever had to change a front wheel tire on a car that is not equipped with a non-reversible steering mechanism, that the wheel will oscillate about its spindle bolt and make it difficult to properly remove or apply the tire.

It is the object of this invention to produce a simple, substantial device that can be connected between the spindle arm and some stationary portion of the automobile chassis for the purpose of locking the wheel against rotation about the spindle bolt.

It is a further object of this invention to so construct this locking device that it can be used as a means for locking the car against theft and so that it may also be employed as a spark plug wrench and for other purposes.

My invention can be most clearly described and most readily understood when reference is had to the accompanying drawing in which the preferred embodiment thereof is shown, and in which:

Fig. 1 is a top plan view of a portion of an automobile with the left front fender removed and shows my locking device in place thereon;

Fig. 2 is a side elevation of my locking device with a small portion broken away at one end to show the manner of securing a lock thereto;

Fig. 3 is a top plan view looking in the direction of the arrow 3 in Fig. 2;

Fig. 4 is a section taken on line 4—4, Fig. 2; and

Fig. 5 is a view showing the locking device about to be applied in place.

Numeral 1 represents one end of an automobile axle to which the spindle body 2 is oscillatively connected by means of the spindle bolt 3. Secured to the spindle body 2 is a spindle arm 4, the end of which is connected by means of a connecting rod 5 to the spindle arm on the other side of the car. The car used in this illustration is provided with radius rods 6, the forward end of which are bolted to the axle. My locking device 7 is secured in place between the spindle arm and the radius rod in the manner shown in Fig. 1.

My locking device 7 has enlarged ends 8 and 9 that project to one side of the body portion in the manner shown in Fig. 2. End member 8 has a notch 10 whose inner end is circular and of a greater width than the distance between the surfaces 11. The diameter of the inner portion of the opening 10 is slightly greater than the greatest dimension of the spindle arm, which is of oblong cross-section, and can therefore be applied to the latter by holding it in such relation thereto that the surfaces 11 embrace the flattened sides of the arm, after which the device can be rotated on the arm until the notch 12 in end 9 engages the radius rod 6. The bail of a padlock 13 (shown dotted in Fig. 2) is then inserted through the opening 14 and serves to hold the locking device from being removed from the radius rod and since the size of the opening 10 is so related to the size of the spindle arm that it can only be removed by first rotating the device in the manner indicated in Fig. 5 it is apparent that an unauthorized person cannot remove the device from the car. While the locking device is in place, it is impossible to steer the car, as the front wheels cannot be moved about their spindle bolts. If the car is parked parallel to a curb, it is impossible to get it away, although it may be freely moved backwards and forwards. If the device is to be used merely for holding the wheel while the tire is removed and applied, the lock 13 is not used.

In order to increase the utility of the device I have provided opposed parallel surfaces 15 in end 8, which fit the spark plugs. The surfaces 11 can also be used for rotating a nut. End 9 has surfaces 16 that fit the hub cap. My improved device therefore serves to hold the wheels while the tires are changed, to lock the automobile against theft, and as a wrench.

It will be noticed from Fig. 3 that the device is curved in two ways. This is for the purpose of producing a better fit, and is essential in the particular combination in which the device is employed.

Having now described my invention, what I claim as new is:

1. In combination, an automobile axle, a spindle body oscillatively secured thereto, a spindle arm secured to said body, a radius rod connected to said axle, rigid means for connecting the spindle arm and radius rod, said means comprising a member having a notch at one end for engaging with the spindle arm, and a similar notch at the other end for engaging with the radius rod.

2. In combination, an automobile axle, a spindle body oscillatively secured thereto, a spindle arm secured to said body, a radius rod connected to said axle, rigid means for connecting the spindle arm and radius rod, said means comprising a member having a notch at one end for engaging with the spindle arm, and a similar notch at the other end for engaging with the radius rod, the notch that engages the spindle arm being of greater width near its bottom.

3. In combination, an automobile axle, a spindle body oscillatively secured thereto, a spindle arm secured to said body, a radius rod connected to said axle, rigid means for connecting the spindle arm and radius rod, said means comprising a member having a notch at one end for engaging with the spindle arm, and a similar notch at the other end for engaging with the radius rod, the notch that engages the spindle arm being of greater width near its bottom, the end that has the notch for engaging the radius rod being provided with a hole for the reception of a lock.

In testimony whereof I affix my signature.

SAMUEL T. LOGAN.